United States Patent [19]

Ishikawa et al.

[11] 4,187,294

[45] Feb. 5, 1980

[54] METHOD FOR PRODUCING EGGS CONTAINING A HIGH AMOUNT OF IODINATED AMINO ACIDS

[75] Inventors: Tadashi Ishikawa, Sagamihara; Hiroshi Kamimae, Yokohama, both of Japan

[73] Assignee: Nihon Nousan Kougyou Co., Ltd., Yokohama, Japan

[21] Appl. No.: 922,581

[22] Filed: Jul. 6, 1978

[51] Int. Cl.$^2$ .............................................. A61K 33/18
[52] U.S. Cl. ...................................... 424/150; 424/319
[58] Field of Search ................................ 424/150, 319

[56] References Cited

U.S. PATENT DOCUMENTS 3,526,508  9/1970  Andelfinger et al. ............... 424/150

OTHER PUBLICATIONS

Chemical Abstracts, vol. 82, (1975), p. 123663u.
Chemical Abstracts, vol. 70, (1969), p. 9632k.

*Primary Examiner*—V. D. Turner
*Attorney, Agent, or Firm*—Haseltine, Lake & Waters

[57] ABSTRACT

A method for producing eggs that contain a high amount (i.e., 7 ppm and over) of iodinated amino acids. Iodinated amino acids are transferred to eggs from live birds such as chickens, ducks and other poultry that are regularly fed with a specially prepared feed containing more than 230 mg. of calcium iodate per kg. of feed. Said eggs are effective in preventing and curing hypercholesteremia.

1 Claim, No Drawings

METHOD FOR PRODUCING EGGS CONTAINING A HIGH AMOUNT OF IODINATED AMINO ACIDS

BACKGROUND OF THE INVENTION

This invention relates to a method for producing eggs containing a high amount of iodinated amino acids.

Eggs are generally known as highly nutritive and well balanced digestible and absorbable food. Recently, however, a sharp controversy has been raised about the cholesterol contained in eggs. Namely, one opinion is that egg eaters are prone to develop heart trouble, whereas another opinion is that there is no causal relation between heart diseases and the cholesterol in eggs. It is reported that as result of such controversy, a number of U.S. consumers are cutting down on their daily egg consumption. For this reason or not, egg consumption has also tended to lessen in Japan recently.

We, inventors, have studied ways of improving the composition of the egg, and have finally discovered that hens fed with a large amount of calcium iodate $Ca(IO_3)_2$ lay eggs containing a higher amount of iodinated amino acids, although the cholesterol content of the egg does not change. We also found that the eating of the said eggs does not increase the amount of cholesterol in the blood, that is to say, haematic cholesterol. On the contrary, it was ascertained by us that the eating of said eggs decreases the amount of haematic cholesterol in the case of a patient suffering hypercholesteremia.

There is seldom reported a deficiency disease of iodine in Japan, since the Japanese people usually eat seaweed containing a large amount of iodine. On the other hand, the people of inland areas of Asia and America suffer from iodine deficiency, and make up for the deficiency by taking iodized salt, namely, common salt admixed with potassium iodide (KI).

Iodine is one of the mineral requirements for hens. The National Research Council specifically has set the demand amount of iodine for hens at about 0.3 mg. per kg. of feed. An example of actual admixture of potassium iodide in feed is reported in "Poultry Science," Vol. XXV, No. 2, March 1946, p 99–104, "The Use of Various Vitamin Supplements in Rations for Laying and Breeding Hens" which reveals the addition of 0.005% potassium iodide or about 2% iodized salt to a ration. Addition of 5 g. iodized salt per kg. of feed is also mentioned in U.S. Pat. No. 3,982,008. Furthermore, it is stated in "Hackh's Chemical Dictionary" McGraw-Hill Book Co., N.Y., 1969, p 354, that iodized salt contains about 0.3% of potassium iodide. In all of the cases, the substance to be added is potassium iodide, and the addition amount is 0.5 mg. to 60 mg. per kg. of feed. It has been ascertained through our study that adding of potassium iodide at such a level is only effective in maintaining the hen's health. It was also proven that addition of potassium iodide over said amount is not a useful method, because the rate of egg laying of hens tends to decrease.

BRIEF SUMMARY OF THE INVENTION

In the case of this invention, the substance to be added is calcium iodate, $Ca(IO_3)_2$. The addition of calcium iodate at a high level of over 230 mg. per kg. of feed increases the hen's rate of egg laying rather than decreases it. Moreover, we were the first to discover that addition of calcium iodate at such a level causes iodinated amino acids to accumulate in the eggs at a high level of 7 ppm or more.

The object of this invention is to provide eggs containing a higher amount of iodinated amino acids to the level effective in preventing and curing hypercholesteremia. Existing commercially available feed and feed admixed with potassium iodide as mentioned in the above cited reference are incapable of attaining a similar object. Thus, our invention represents a complete innovation of past concepts and is considered worthy of being patented.

DETAILED DESCRIPTION OF THE INVENTION

With respect to the present invention, the term "bird" means any one of the feathered tribes which lay eggs to be originarily used for food, such as a chicken, a duck, a quail, a bantam, a guinea fowl and the like. Both the anhydride and hydrate of calcium iodate can be given to birds singly or combined. In any case, it is required that calcium iodate is given to the birds at a level of 230 mg. or more per kg. of feed. If the given amount of calcium iodate is less than said level, it is impossible to produce eggs containing iodinated amino acids of 7 ppm or more. In the case of eggs containing iodinated amino acids of less than 7 ppm, eating one egg per day is ineffective in decreasing haematic cholesterol. Considering the content of iodinated amino acids formed in eggs, the upper limit of the given amount is desirably about 2,000 mg. per kg. of feed, although it is not especially restricted. In the case of potassium iodide, the rate of egg laying decreases if given to birds at the same level as calcium iodate in the present invention. Therefore, potassium iodide is unsuitable for use in this method.

In the case of chicken hens, they lay eggs containing about 600γ iodinated amino acids per egg, if calcium iodate is given to them at the level of more than 230 mg. per kg. of feed for about 10 days. It has been ascertained by our study that iodinated amino acids are primarily composed of monoiodohistidine, diiodohistidine, monoiodotyrosine, diiodotyrosine, triiodothyronine and tetraiodothyronine. If the rate of egg consumption is one egg daily, the suitable content of iodinated amino acids in an egg is 7 ppm to 60 ppm. The iodinated amino acids content of the egg can be adjusted by changing the given amount of calcium iodate in the feed within the above extent.

The reason why eggs containing iodinated amino acids are entirely free from harmful after-effects and virulence seems to be that a live bird body acts as a filter. We put said eggs to an acute virulence test. The result of the test is as follows:

Acute Virulence Test

Animals used:
Rats, Wister descent, female
Weight: 100–110 g. Number: 10

Dried eggs of this invention were given to the rats orally at a dosage increased in geometric ratio to the rat's weight to the maximum of 1,000 mg. of iodinated amino acids content per kg. of the rat's weight, and the rats were observed after 7 days. None of the rats died nor even lost weight during the period. Then we made a biological test on the decreasing effect of hypercholesterol, using the said eggs of this invention.

Animals used:
Rats, Wister, descent, male
Weight: About 120 g. per rat

One group. 10 rats

The rats were bred in a cage at a temperature of 75° ±1° F. and at relative humidity of 50 to 60%. The rats were given feed containing 1.5% cholesterol for 5 days so as to contract hypercholesteremia. The test object was dissolved in distilled water, and given to the rats orally with a stomach sonde once a day for 5 days at the same time that said feed containing a higher amount of cholesterol was given.

The test object was made by spray-drying the said eggs containing a higher amount of iodinated amino acids. The test object contained 250 mg. of iodinaed amino acids per kg., and was given to the rats at a rate of 1 g. daily. The rats were not fed for a full night after being given the test object, and the following morning, a certain quantity of test blood was taken from the fundus of the rat's eyes. The amount of haematic cholesterol was measured by the Zurkowsk Method. The rats in the comparison group were given 0.2 mg. of potassium iodide every day by the same way as the said test object. The rats in the contrast group were given neither potassium iodide nor said test object. The result of the test is stated in Table 1.

Table 1:

| Case No. | The Amount of Haematic Cholesterol (mg./dl.) | | |
|---|---|---|---|
| | Contrast Group | Comparison Group | Test Group |
| 1 | 277 | 171 | 183 |
| 2 | 300 | 492 | 242 |
| 3 | 384 | 204 | 197 |
| 4 | 393 | 458 | 279 |
| 5 | 333 | 310 | 192 |
| 6 | 309 | 343 | 248 |
| 7 | 360 | 269 | 236 |
| 8 | 239 | 299 | 239 |
| 9 | 342 | 315 | 253 |
| 10 | 246 | 222 | 201 |
| Average | 318.7 | 308.0 | 227.0 |

Thus, decreasing effect of haematic cholesterol was apparently proven.

Clinical test of the said eggs was made on 21 patients of hypercholesteremia whose haematic cholesterol value was more than 230 mg./dl. Every patient ate one egg per day which contained about 0.25 mg. of iodinated amino acids. The result of the clinical test is reported in Table 2.

Table 2:

| Patient No. | Sex | Age | The Amount of Cholesterol (mg./dl.) | | |
|---|---|---|---|---|---|
| | | | Before Use | 1 Month After Use | 2 Months After Use |
| 1 | Male | 48 | 288 | 267 | 254 |
| 2 | Male | 42 | 253 | 220 | 186 |
| 3 | Male | 49 | 283 | 260 | 255 |
| 4 | Female | 30 | 248 | 255 | 260 |
| 5 | Male | 53 | 265 | 238 | 219 |
| 6 | Male | 27 | 245 | 253 | 260 |
| 7 | Male | 35 | 280 | 260 | 240 |
| 8 | Male | 60 | 322 | 280 | 260 |
| 9 | Male | 66 | 290 | 273 | 252 |
| 10 | Male | 29 | 245 | 250 | 250 |
| 11 | Male | 56 | 292 | 250 | 225 |
| 12 | Female | 61 | 273 | 242 | 220 |
| 13 | Male | 65 | 350 | 345 | 353 |
| 14 | Male | 71 | 321 | 305 | 276 |
| 15 | Male | 38 | 240 | 256 | 243 |
| 16 | Male | 28 | 253 | 240 | 250 |
| 17 | Female | 43 | 282 | 240 | 220 |
| 18 | Female | 55 | 245 | 230 | 250 |
| 19 | Male | 62 | 275 | 260 | 244 |
| 20 | Female | 48 | 315 | 286 | 262 |

Table 2:-continued

| Patient No. | Sex | Age | The Amount of Cholesterol (mg./dl.) | | |
|---|---|---|---|---|---|
| | | | Before Use | 1 Month After Use | 2 Months After Use |
| 21 | Male | 54 | 286 | 240 | 215 |

Notes:
(1) Patients of Nos. 1 to 6 had never used any commercially available medicine for decreasing cholesterol, and continued to not use any medicine while using the eggs of this invention.
(2) Patients of Nos. 7 to 11 had used medicine for decreasing cholesterol, but stopped using it after they began to use eggs of this invention. The value of "Before Use" was measured while medicine was being used.
(3) Patients of Nos. 12 to 15 had never used any of the said medicine, but began using medicine at the same time when they began using eggs of this invention.
(4) Patients of Nos. 16 to 21 had used said medicine, and continued to use it even after they began using eggs of this invention. The value of "Before Use" was measured while only said medicine was being used.

Thus it is apparent from Table 2 that eggs of this invention containing a higher amount of iodinated amino acids are effective in decreasing cholesterol.

Some of the patients of the above test stopped using eggs of this invention for a while, and then began to use them again. The result of the secondary test is shown in Table 3.

Table 3:

| Patient No. | The Amount of Cholesterol (mg./dl.) | | | |
|---|---|---|---|---|
| | 2 Months After Use | 2 Months After Stopping Use | 1 Month After Resuming Use | 2 Months After Resuming Use |
| 8 | 260 | 305 | 270 | 252 |
| 9 | 252 | 282 | 260 | 245 |
| 11 | 225 | 285 | 240 | 215 |
| 12 | 220 | 280 | 252 | 215 |
| 14 | 276 | 298 | 272 | 255 |
| 17 | 220 | 273 | 252 | 234 |
| 20 | 262 | 296 | 261 | 246 |

Thus it is easily understood that eggs of this invention are remarkably effective in decreasing cholesterol. Although eggs of this invention containing iodinated amino acids do not have an immediate effect, they are obviously effective in curing hypercholesteremia such as arteriosclerosis and the like, if patients eat them at the rate of one egg daily for one month and over. Furthermore, persons in normal health can eat eggs of this invention every day without any anxiety of increasing their haematic cholesterol amount.

EXAMPLE

The test feed A and the test feed B were made by adding calcium iodate to commercially available feed for hens at the ratio of Table 4. Each test feed was given to each group of 20 hens that had begun to lay eggs one month ago. Hens of the contrast group were given commercially available feed to which calcium iodate was not added.

Table 4:

| | (Unit: mg./kg.) | |
|---|---|---|
| Test Feed | A | B |
| Calcium Iodate | 230 | 500 |

Hens of Test Group A fed with test feed A and hens of Test Group B fed with test feed B laid eggs containing a higher amount of iodinaed amino acids as shown in Table 5.

Table 5:

| | (Unit: ppm) | | |
|---|---|---|---|
| | Test Group A | Test Group B | Contrast Group |
| Before Test | 0.08 | 0.07 | 0.08 |
| 10 Days After Test | 13.2 | 25.6 | 0.08 |
| 30 Days After Test | 16.9 | 28.2 | 0.08 |

We claim:

1. A method for increasing the iodine content of the eggs of egg-laying birds in the form of iodinated amino acids in an amount of 7 ppm or more, said eggs being useful in treating hypercholesterolemia, which comprises providing a feed composition containing calcium iodate in the amount of 230–2000 mg per kg of feed, and feeding said feed composition to egg-laying birds.

* * * * *